3,167,529
PROCESS FOR PREPARING HIGH MOLECULAR WEIGHT POLYMERS OF UNSATURATED ALDEHYDES AND RESULTING PRODUCTS
Alva T. Stewart, Berkeley, and Rudolph F. Fischer, Oakland, Calif., assignors to Shell Oil Company, a corporation of Delaware
No Drawing. Filed Dec. 14, 1959, Ser. No. 859,154
12 Claims. (Cl. 260—67)

This invention relates to a new process for polymerizing unsaturated aldehydes. More particularly, the invention relates to a new process for polymerizing alpha,beta-ethylenically unsaturated aldehydes to form polymers having unexpectedly high molecular weights, to the new high molecular weight polymers so produced and to valuable derivatives thereof.

Specifically, the invention provides a new and highly efficient process for converting alpha,beta-ethylenically unsaturated aldehydes, such as acrolein, to water-insoluble polymers having molecular weights unobtainable heretofore with conventional polymerization processes. The new process comprises contacting the alpha,beta-ethylenically unsaturated aldehydes, preferably in an aqueous system, with a free radical yielding catalyst and a salt of a multivalent metal in the presence of a chelating agent and preferably in the presence of an anti-coalescent agent. The invention also provides the new high molecular weight polymers prepared by this process.

As a special embodiment, the invention also provides useful and valuable water-soluble derivatives of the above-noted high molecular weight polymers obtained by treating the said polymers with water-solubilizing agents, such as sodium bisulfite or sulfur dioxide. As a further special embodiment, the invention provides a method for utilizing the above-described water-soluble high molecular weight polymers in the treatment of paper to impart unexpectedly high wet strengths and improved dimensional stability.

As a further embodiment, the invention provides new and useful solvent soluble derivatives of the above-noted high molecular weight polymers.

It is known that unstabilized acrolein changes spontaneously into a solid water-insoluble polymer known as "disacryl." This same insoluble polymer can also be obtained by heating the acrolein to high temperatures with peroxides. Such polymers can be converted to a soluble form by treatment with alcohols, thiophenols and the like. The insoluble and soluble forms of these polymers, however, have never acquired any technical importance chiefly because they are of very low molecular weight, at most contain only 60–75 mol percent theoretical aldehyde function, and are incapable of utilization in the conventional polymer applications. In addition, many of the products obtained by prior methods are discolored and thus also unsuited for many industrial applications.

It is an object of the invention, therefore, to provide a new process for polymerizing unsaturated aldehydes, such as acrolein. It is a further object to provide a new process for converting alpha,beta-ethylenically unsaturated aldehydes to polymers having very high molecular weights. It is a further object to provide a process for preparing high purity high molecular weight polymers from acrolein and other unsaturated aldehydes which are particularly useful and valuable in industry. It is a further object to provide new water-soluble and solvent-soluble derivatives of high molecular weight aldehyde polymers. It is a further object to provide new water-insoluble high molecular weight polymers from unsaturated aldehydes as acrolein. It is a further object to provide new water-soluble polymers which are particularly useful for treating paper. It is a further object to provide valuable solvent-soluble derivatives of the new high molecular weight polymers of the unsaturated aldehydes. These and other objects of the invention will be apparent from the following detailed description thereof.

It has now been discovered that these and other objects may be accomplished by the process of the invention which comprises contacting the alpha,beta-ethylenically unsaturated aldehydes, preferably in an aqueous system, with a free radical yielding catalyst and a salt of a multivalent metal in the presence of a chelating agent and preferably in the presence of an anti-coalescent agent. It has been found that polymers prepared by this method have unexpectedly high molecular weights. Polymers prepared by this method, for example, have intrinsic viscosity values of at least 0.90 and as high and higher than 3.0 (as determined on the solubilized form of the polymer). On a mol weight basis such products would have mol weights of say about 100,000 to 2,000,000. Such products are new and are free of discoloration, possess 97–99.5 or greater percent theoretical aldehyde function, produce films of exceptional clarity and strength and exhibit properties not shown for the prior known polymers which have intrinsic viscosities varying generally from 0.1 to 0.5 dl./g.

The water-soluble derivatives of the new high molecular weight polymers prepared as noted below have been found to be particularly useful and valuable as wet strength agents for paper. When applied in aqueous systems to paper, the new polymers react therewith to give paper products having unexpectedly high wet strength values. Evidence of the superior properties of the new polymers for this application is shown in the working examples at the end of the specification.

The solvent-soluble derivatives of the high molecular weight polymers, prepared as noted below, as useful and valuable for the preparation of films, coatings, moldings and the like.

The alpha,beta-ethylenically unsaturated aldehydes used in making the new polymers comprise those monoaldehydes having an ethylenic group in an alpha,beta-position relative to the aldehyde group, such as for example, acrolein and alpha and beta-substituted acroleins, as methacrolein alpha-ethylacrolein, alpha-butylacrolein, alpha-chloroacrolein, beta-phenylacrolein, alpha-decylacrolein, alpha-cyclohexylacrolein and the like. Preferred aldehydes to be employed in making the polymers include the alpha,beta-monoethylenically unsaturated monoaldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration.

The catalyst system used in the polymerization of the above-described aldehydes contains a free radical yielding catalyst and a salt of a multivalent metal. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary-butylisopropylbenzene hydroperoxide, tertiary butyl peracetate, tertiary butyl perbenzoate, ditertiary butyl phthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted group which contain no more than 18 carbon atoms per molecule.

The above-described catalysts are employed in small amounts, the exact amount being dependent upon the particular type selected. In general, the amount of catalyst used will vary from about $1 \times 10^{-6}$ to about $2 \times 10^{-2}$ mols per mol of unsaturated aldehyde being polymerized. Preferred amounts vary from about $1 \times 10^{-3}$ to $1 \times 10^{-4}$ mols per mol of material being polymerized.

A salt of a multivalent metal is also a component of the catalyst system. By multivalent metal is meant one that can change its valence state reversibly. Examples of such metals include iron, manganese, copper, vanadium cobalt, nickel, tin, silver, titanium, etc. When added to the reaction mixture, the metal must be at least in part in a lower valence state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

The amount of the metal salt employed will depend upon the amount of the peroxide catalyst utilized. It is preferred to have one gram ion of the metal per mol of the peroxide catalysts, and more preferably from .5 to 1 gram ions per mol of peroxide.

Another essential component of the reaction mixture is a chelating agent, i.e., a material which forms a complex with polyvalent metal ions; that is the material and the metal ion unite through coordinate linkages stable in aqueous systems. These compounds are described in detail in Martell and Colvin, "Chemistry of the Metal Chelate Compounds" (1952). These materials possess at least one and preferably a plurality of electron-donating groups. The elements in such groups preferably fall in Groups V and VI of the periodic table, such as, for example, nitrogen, oxygen and sulfur. Examples of such chelating agents include, among others, metal cyanides, such as potassium, sodium, lithium and alkali metal and alkaline earth metal cyanides, and corresponding cyanates and thiocyanates, as well as malonic acid, ethylmalonic acid, diethylmalonic acid, 8-hydroxyquinoline, dimethylglyoxime, ethylene diamine, trimethylenediamine and their substituted products, such as diacetonediamine, diethylenetriamine, N,N-diethylethylene diamine, triethylene tetramine, propylenediamine, tris(2-aminoethyl)amine, 1,2,3-triaminopropane, N(3 - amino - 2 - hydroxypropyl) - 2-hydroxy - 1,3 - propanediamine, N,N'-di(hydroxypropyl) diethylene triamine, bipyridyl, o-phenanthroline, amino acids as glycine, alanine, beta-alanine, asparagine, glutamic acid, glycylglycine, phenylalanine, ammonia diacetic acid, ammonia triacetic acid, ethylenediamine tetracetic acid, ammonia dipropionic acid, ethylene diamine dipropionic acid, 1,3-diaminocyclohexane-N,N'-tetracetic acid, 3-sulfonaniline diacetic acid, aniline diacetic acid, 4-aminobenzoic acid-N,N-diacetic acid, beta-aminoethylphosphonic acid-N,N-diacetic acid, glycine-N-propionic acid, N-benzylethylenediamine triacetic acid and methylamine-N,N-diacetic acid, salicylaldehyde, 3-n-propylsalicylaldehyde, 3-ethoxysalicylaldehyde, 2-hydroxy-1-naphthaldehyde, acetylacetone, trifluoroacetylacetone, benzoylacetone, ethylacetoacetate, acetic acid, propionic acid, oxalic acid, phthalic acid, succinic acid, citraconic acid, 5-chloro-1,10-phenanthroline, 5 - phenyl - 1,10 - phenanthroline, glycylglycidylglycine, histidine, methionine, proline, serine, tryptophan, tyrosine, glyconic acid, beta-hydroxybutyric acid, salicylic acid, 5-sulfosalicyclic acid, aminophenol, and 3,6-disulfo-1,8-dihydroxynaphthalene.

Preferred chelating agents to be employed are those which are effective in neutral and acid media and which form with polyvalent metals one or more pentatomic or hexatomic heterocyclic rings containing the metal as one of the components of the ring or rings. These preferred materials also possess a plurality of electron-donating groups, such as, for example, those containing N, O or S, such as amino groups, OH groups, aldehyde groups, and the like.

Especially preferred are chelating agents containing nitrogen and carboxyl groups which carboxyl groups appear in the form of partially or wholly neutralized form as with sodium, potassium or alkali metal salts (including ammonium). Examples of these include, among others, the sodium and potassium salts of ammonia diacetic acid, ammonia triacetic acid, ethylene diamine tetraacetic acid, ammonia dipropionic acid, ethylene diamine dipropionic acid, 1,3-diaminocyclohexane-N,N-tetraacetic acid, 3-sulfoaniline diacetic acid, aniline diacetic acid, 4-aminobenzoic acid-N,N-diacetic acid, beta-aminoethylphosphonic acid-N,N-diacetic acid, glycine-N-propionic acid and the like, and mixtures thereof.

The amount of the chelating agent employed will depend on the amount of the metal salt employed. It is preferred to have at least one mol of the chelating agent per gram ion of the metal present. More preferably, from 1 to 1.5 mols of the chelating agent is employed per gram ion of metal present.

Particularly superior results are obtained when an anticoalescent agent is included in the reaction mixture. The presence of such materials effects unexpectedly an enhanced rate of polymerization and maintenance of molecular weight. The agent may be a cationic, anionic or non-ionic material and have a great variety of different compositions. Preferred materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane di- stearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bi-phenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl phenyl polyethylene glycol ether, isopropylphenyl polyethyene glycol monoether and the like.

Especially preferred materials to be used, particularly because of the superior results obtained therewith such as surprisingly rapid rate of polymerization include the water-soluble agents as polyethylene oxides, polyacrylamides, starch, casein, styrene-maleic anhydride copolymers and methocell.

The amount of the anti-coalescent agent employed in the polymerization process will vary over a considerable range depending upon the unsaturated aldehyde to be polymerized and the particular agent selected. In general, the amount of the agent will vary from about .1% to 80% by weight of the unsaturated aldehyde. Preferred amounts vary from .5% to 25% by weight of the monomer.

It is also desirable in some cases to include in the reaction medium minor amounts of other monoethylenically unsaturated monomers which will undergo copolymerization with the unsaturated aldehydes. Examples of these include, among others, vinylpyridine, styrene, allyl alcohol, acrylic and methacrylic acids and their alkyl esters, vinyl acetate, monoolefins, allyl esters of monocarboxylic acids, vinyl halides, acrylonitrile, methacrylonitrile and the like and mixtures thereof. These monomers are preferably employed in amounts varying from about 0.1% to 25% by weight of the monomers being polymerized. Minor amounts of polyethylenically unsaturated compounds, such as butadiene, isoprene and the like may also be employed.

The polymerization may be conducted in non-basic liquid media, but is preferably conducted in an aqueous system. The amount of water employed may vary considerably. Preferably one employs from 100 to 500 parts of water per 100 parts of monomer to be polymerized.

The temperature employed in the process may also vary over a considerable range. It is generally preferred to employ relatively low temperatures. In general, temperatures will vary from the freezing point of the reaction mixture to about 50° C. Preferred temperatures range from about 0° C. to 45° C. Atmospheric, superatmospheric and subatmospheric pressures may be utilized as desired.

The polymerization is preferably effected in an inert atmosphere. This may preferably be accomplished by passing inert gases such as nitrogen, methane, etc. into and through the reaction mixture.

The polymer will precipitate out as a white solid and may be recovered by any suitable means, such as filtration, centrifugation and the like. After recovery, it is generally desirable to wash the polymer with water and acetone and then dry the product.

The polymers are solid substantially white high molecular weight products. The have intrinsic viscosities (as determined on the solubilized form) of at least 0.6 and preferably 0.9 to 5.0. These values are determined by the conventional technique of polyelectrolyte viscosity measurement at 25° C. on a mol weight basis, such polymers have mol weights ranging from about 100,000 to 2,000,000 as determined by the light scattering technique.

The polymers are also characterized by the fact that they possess over 95% and preferably 97–99.5% or greater percent theoretical aldehyde function, i.e., when the polymer is subjected to conventional test for presence of aldehyde groups (e.g., addition of hydroxylamine hydrochloride and titrate liberated $H_2O$ with Karl Fischer reagent) the results show that over 95% of the theoretical aldehyde groups present by addition polymerization at the double bonds are present in the polymer as such or in hydrated form. Further analysis has shown that the polymer contains many groups wherein the aldehyde is in a hydrated form as

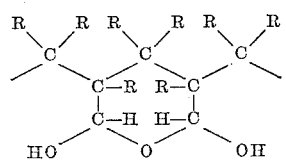

and some

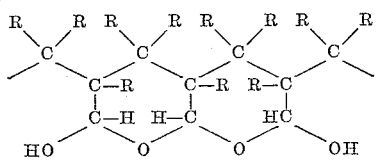

wherein R is hydrogen or hydrocarbon and particularly alkyl, cycloalkyl and aryl radicals containing 1 to 10 carbon atoms. This clearly distinguishes the polymers of the invention from those produced by conventional methods wherein the polymer possesses at most only 60–75% of the theoretical aldehyde function.

The polymers are also characterized by being insoluble in water and insoluble in conventional solvents, such as benzene, toluene, acetone and the like.

Materials such as acetone tend to swell the polymer, but do not dissolve the material. The polymers may be dissolved by reaction with materials as alcohols, mercaptans and the like.

While the above-described polymers may be utilized as such by molding at high temperatures to form plastic articles, they have been found to be of greatest use in the solubilized form.

The water-soluble derivatives of the new high molecular weight polymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of the water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydrofuran may also be employed to assist in the dissolution.

The water-soluble derivatives will have substantially the same molecular weight as the water-insoluble basic polymer. In the case of the sulfur dioxide and bisulfite, the polymer will also contain a plurality of free sulfonic groups or water-soluble salt sulfonate groups contained in the polymer molecule and therefor may be regarded as polymeric polysulfonic acids and polymeric polysulfonate metal salts. For example, the polymer will contain

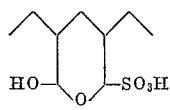

groups. (The backbone of the polymer is as described above.)

The water solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, Jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperature of the solution may be employed.

The solvent-soluble polymer derivative may be recovered by any suitable means, such as precipitation, extraction, distillation and the like.

The solvent-soluble derivatives are in most cases substantially white to light colored solids having substantially the same molecular white as the basic insoluble polymer. The acetal derivatives, for example, will contain units as

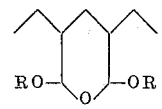

(The backbone of the polymer is as described above.) wherein R is derived from the alcohol by removing an OH group, such as hydrocarbon radicals as alkyl, cycloalkyl radicals containing 1 to 10 carbon atoms. The solvent-soluble products will be thermoplastic rather than thermosetting and can be molded to form valuable plastic materials. The acetal derivatives prepared from the high molecular weight polymers and lower alcohols, such as methanol, generally have strengths comparable to those of poly(methyl methacrylate) and superior to general purpose polystyrene. The heat distortion points generally vary from about 100° C. to 130° C., and the tensile strengths vary from about 6,000 to 10,000 p.s.i.

Solvent soluble derivatives of the polymer may also be used in the preparation of coatings and impregnating solutions. The solvent soluble products may also be used as viscosity index improvers for various fluids, such as brake fluids and lubricating oil compositions.

To illustrate the manner in which the invention may be carried out, the following examples are given. It is to be understood, however, that the examples are for the purpose of illustration and the invention is not to be regarded as limited to any of the specific materials or conditions recited therein.

*Example I*

(A) This part of the example illustrates the preparation of a high molecular weight polymer of acrolein using disodium salt of ethylene diamine tetracetic acid as the chelating agent.

100 parts of acrolein (freshly distilled under nitrogen) was added to 300 parts of freshly distilled water and .27 part potassium persulfate, .204 part ferrous chloride tetrahydrate and .4 part of disodium dihydrogen ethylene diamine tetracetic acid added thereto. The resulting mixture was stirred for 24 hours at room temperature under atmosphere of nitrogen. During that period a white solid precipitated to the bottom. The mixture was filtered and the solid precipitate was washed with water and dried yielding 38 parts product. The resulting product was a white powder polymer having an intrinsic viscosity (as determined on the sulfur dioxide solubilized form) of 1.12 dl./g. The polymer was insoluble in water and solvents, such as benzene and acetone, but was dissolved by aqueous sulfur dioxide and sodium bisulfite.

A 2% water solution of the $SO_2$-solubilized polymer was prepared and sheets of bleached sulfite paper passed into and through the solution. The treated sheets were then pressed out on dry paper and allowed to dry at room temperature. The resulting product had the appearance, feel and flexibility of the untreated paper, but demonstrated surprising improvement in fold endurance, dimensional stability, resistance to hydrolysis and improvement in wet strength. The product had a dry strength of 12.8 pounds per inch and wet strength of 5.4 pounds per inch representing a 42% strength retention.

30 parts of the insoluble high molecular weight polymer produced by the above-noted polymerization process was covered with 30 parts of a mixture of 267 parts of methanol and 30 parts of phenol and 3 parts of p-toluenesulfonic acid. About 300 parts of benzene was then added and the suspension stirred at room temperature and warmed to reflux. The mixture was held there for 6 hours and then cooled, washed and the product poured into methanol and filtered. The resulting product was a white solid polymer which was thermoplastic and could be molded at about 150° C. to form strong flexible castings.

(b) This part of the example illustrates the poor results obtained by a related process wherein the chelating agent is eliminated from the reaction mixture.

125 parts of acrolein was mixed with 250 parts of water, 5.4 parts of potassium persulfate and 4 parts of ferrous chloride hydrate. No chelating agent or surface active agent was present. The mixture was kept at room temperature for several hours. The resulting product was tan colored and had a low intrinsic viscosity of .17.

*Example II*

This example illustrates the preparation of a high molecular weight polymer of acrolein using disodium ethylene diamine tetraacetic acid and an anti-coalescent agent.

100 parts of acrolein was added to 400 parts of water and to this mixture was added .271 part of potassium persulfate, .203 part of ferrous chloride tetrahydrate, 1 part of nonylphenol-ethylene oxide adduct as anti-coalescent agent and .4 part of disodium salt of ethylene diamine tetraacetic acid. The resulting mixture was stirred for 24 hours at room temperature under atmosphere of nitrogen. During that period a white solid precipitated to the bottom. The mixture was filtered and the solid precipitate was washed with water and dried to yield 47 parts polymer. The resulting product was a white powder polymer having an intrinsic viscosity (as determined on the sulfur dioxide solubilized form) of 1.8 dl./g. The polymer was insoluble in water and solvents, such as benzene and acetone, but was dissolved by aqueous sulfur dioxide and sodium bisulfite.

A 2% water solution of the sulfur dioxide-solubilized polymer was prepared and sheets of bleached sulfite paper passed into and through the solution. The treated sheets were then pressed out on dry paper and allowed to dry at room temperature. The resulting product had the appearance, feel and flexibility of the untreated paper, but demonstrated surprising improvement in fold endurance, dimensional stability, resistance to hydrolysis and improvement in wet strength. The product had a dry strength of 14.1 pounds per inch and wet strength of 8.2 pounds per inch representing a 58% strength retention when wet.

A methyl acetal derivative of the insoluble high molecular weight polymer prepared by the above-described polymerization process was also prepared. This product is a thermoplastic material which could be molded to form strong flexible plastic materials.

*Example III*

100 parts of acrolein was added to 300 parts of water and to this mixture was added .272 part potassium persulfate, .203 part of ferrous chloride tetrahydrate and .4 part of disodium salt of ethylene diamine tetraacetic acid. The resulting mixture was stirred for 24 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g. The polymer was insoluble in water and solvents, such as benzene and acetone, but was dissolved by aqueous sulfur dioxide and sodium bisulfite.

A 2% water solution of the $SO_2$-solubilized polymer was prepared and sheets of bleached sulfite paper passed into and through the solution. The treated sheets were then passed out on dry paper and allowed to dry at room temperature. The resulting product had the appearance, feel and flexibility of the untreated paper, but demonstrated surprising improvement in fold endurance, dimensional stability, resistance to hydrolysis and improvement in wet strength. The product had a dry strength of 13 pounds per inch and wet strength of 6.4 pounds per inch.

A methyl acetal derivative of the insoluble high molecular weight polymer prepared by the above-described polymerization process was also prepared. This product is a thermoplastic material which could be molded to form strong flexible plastic materials.

*Example IV*

1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetraacetic acid. This mixture was stirred for 42 hours at room temperature (20° C.) under atmosphere of nitrogen. The resulting product was a white powder polymer having an intrinsic viscosity of 1.5. The polymer was insoluble in water and solvents, such as benzene and acetone, but dissolved in aqueous sodium dioxide and sodium bisulfite.

An acetal derivative of the above-noted insoluble high molecular weight polymer was prepared by the procedure shown in Example I with the exception that the alcohol employed was as follows: ethyl alcohol, cyclohexanol, allyl alcohol, butyl alcohol and isoamyl alcohol.

*Example V*

100 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for 6 hours with stirring and under an atmosphere of nitrogen. The resulting 46 parts product was a white powder polymer having an intrinsic viscosity of 1.02 dl./g. The polymer was insoluble in water and solvents, such as acetone and benzene, but was dissolved by ethylene chlorohydrin and aqueous sulfur dioxide. An aqueous sulfur dioxide solution was used to treat paper as shown in the preceding examples.

A methyl acetal derivative of the insoluble high molecular weight polymer prepared by the above-described polymerization process was also prepared. This product is a thermoplastic material which could be molded to form strong flexible plastic materials.

*Example VI*

Examples I to V are repeated with the exception that the salt employed was each of the following in place of the ferrous chloride: ferrous sulfate, silver nitrate, titanium trichloride, vanadium dichloride, and cobaltous chloride. Related results are obtained.

*Example VII*

Examples I to VI are repeated with the exception that the chelating agent is replaced by each of the following: citric acid, 8-hydroxy-quinoline, dimethyl glyoxime, ethylene diamine dipropionic acid, and glycine. Related results are obtained.

*Example VIII*

Examples I to VII are repeated with the exception that the peroxide is replaced by each of the following: ditertiary butyl peroxide, cumene hydroperoxide, hydrogen peroxide and tertiary butyl hydroperoxide. Related results are obtained.

Example IX

Example II was repeated with the exception that the anti-coalescent agent employed was as follows: polyethylene oxide, polyacrylamide, starch, casein, styrene-maleic anhydride copolymer, methocell, alkylbenzene sulfonate dialkyl sulfosuccinate ester and benzyl trimethyl ammonium chloride. Related results are obtained.

Example X

Examples I and II are repeated in a series of experiments with the exception that from 1% up to 10% by weight of the acrolein was replaced with each of the following monomers: styrene, vinylpyridine, ethyl acrylate and allyl alcohol. High molecular weight solid copolymers are obtained.

Example XI 100 parts of methacrolein was combined with 200 parts of water, 0.272 part of potassium persulfate, 0.200 part of ferrous chloride hydrate and 0.4 part of disodium ethylene diamine tetraacetic acid. The resulting mixture was stirred at room temperature for 2.2 hours under an atmosphere of nitrogen. During that time a white solid high molecular weight polymer precipitated. The polymer was insoluble in water, but readily dissolved in ethylene chlorohydrin.

We claim as our invention:

1. A process for preparing polymers having an intrinsic viscosity between 1.8 and 5.0 dl./g. and containing at least 75% by weight of polymerized alpha,beta-ethylenically unsaturated monoaldehyde containing from 3 to 12 carbon atoms, which comprises contacting the unsaturated monoaldehyde containing from 3 to 12 carbon atoms in an aqueous medium with (1) a free radical yielding catalyst in an amount varying from about $1 \times 10^{-6}$ to $2 \times 10^{-2}$ mols per mole of unsaturated aldehyde and (2) a salt of a metal which can change its valence state reversibly and in an amount sufficient to furnish from .5 to 1 gram ion of metal per mole of the free radical yielding catalyst, in the presence of a chelating agent at a temperature varying from the freezing point of the reaction mixture to 50° C., the amount of the chelating agent employed being sufficient to furnish from 1 to 1.5 mols of agent per gram ion of the metal in the aforementioned salt.

2. A process for preparing a homopolymer having an intrinsic viscosity between 1.8 and 5.0 dl./g. from alpha,beta-ethylenically unsaturated monoaldehydes containing 3 to 12 carbon atoms which comprises contacting the unsaturated aldehyde in an aqueous medium with (1) a peroxide polymerization catalyst in an amount varying from about $1 \times 10^{-6}$ to $2 \times 10^{-2}$ mols per mol of unsaturated aldehyde, and (2) a salt of a metal which can change its valence state reversibly in an amount sufficient to furnish from .5 to 1 gram ion of metal per mol of the peroxide catalyst, in the presence of a chelating agent at a temperature varying from 0° C. to 45° C., the amount of the chelating agent being sufficient to furnish from 1 to 1.5 mols of agent per gram ion of the metal in the aforementioned salt.

3. A process as in claim 2 wherein the unsaturated aldehyde is acrolein.

4. A process as in claim 2 wherein the unsaturated aldehyde is methacrolein.

5. A process as in claim 2 wherein the chelating agent is one that is effective in neutral and acid media and which forms with polyvalent metals at least one pentatomic to hexatomic heterocyclic ring containing the polyvalent metal as one of the components of the ring.

6. A process as in claim 2 wherein the chelating agent is one that possesses a plurality of functional groups containing a member of the group consisting of oxygen, nitrogen and sulfur.

7. A process as in claim 2 wherein the chelating agent is an alkali salt of a polyamine polyalkanoic acid.

8. A process as in claim 2 wherein the chelating agent is the disodium salt of ethylene diamine tetraacetic acid.

9. A process for preparing a homopolymer of acrolein having an intrinsic viscosity between 1.8 and 5.0 dl./g. which comprises contacting the acrolein in an aqueous system with (1) a peroxide polymerization catalyst in an amount varying from about $1 \times 10^{-6}$ to $2 \times 10^{-2}$ mols per mol of acrolein, (2) a salt of a metal which can change its valency state reversibly in an amount sufficient to furnish from .5 to 1 gram ion of metal per mol of the peroxide catalyst, and (3) .1% to 5% by weight of a surface active agent of the group consisting of cationic, anionic and nonionic surface active agents, in the presence of a chelating agent at a temperature varying from 0° C. to 45° C., the amount of the chelating agent being sufficient to furnish from 1 to 1.5 mols of agent per gram ion of the metal in the aforementioned salt.

10. A process as in claim 9 wherein the metal salt is an iron salt.

11. A process as in claim 9 wherein the metal salt is a silver salt.

12. A process as in claim 9 wherein the surface active agent is an alkylene oxide adduct of a polyhydric compound.

References Cited in the file of this patent

UNITED STATES PATENTS

| | | |
|---|---|---|
| 2,657,192 | Miller et al. | Oct. 27, 1953 |
| 2,993,878 | Marks | July 25, 1961 |
| 3,016,297 | Mochel et al. | Jan. 9, 1962 |
| 3,068,203 | Schweitzer | Dec. 11, 1962 |
| 3,079,357 | Fischer | Feb. 26, 1963 |

FOREIGN PATENTS

| | | |
|---|---|---|
| 596,620 | Great Britain | Jan. 7, 1948 |
| 797,459 | Great Britain | July 2, 1958 |
| 803,053 | Great Britain | Oct. 15, 1958 |